(12) United States Patent
Hou

(10) Patent No.: US 6,678,476 B1
(45) Date of Patent: Jan. 13, 2004

(54) WDM WITH OPTICAL INTERLEAVING FOR INCREASED CHANNEL CAPACITY

(75) Inventor: Hongtao Hou, Santa Clara, CA (US)

(73) Assignee: Oplink Communications, Inc., San Jose, CA (US)

( * ) Notice: Subject to any disclaimer, the term of this patent is extended or adjusted under 35 U.S.C. 154(b) by 603 days.

(21) Appl. No.: 09/702,359

(22) Filed: Oct. 30, 2000

(51) Int. Cl.[7] ................................................ H04J 14/02
(52) U.S. Cl. ........................ 398/79; 398/86; 359/494; 385/24
(58) Field of Search ................... 398/79, 82, 86–87; 359/494–495; 385/24

(56) References Cited

U.S. PATENT DOCUMENTS 5,694,233 A * 12/1997 Wu et al. ..................... 398/49
6,490,377 B1 * 12/2002 Li .............................. 385/11
6,546,166 B1 * 4/2003 Liu et al. .................... 385/24

FOREIGN PATENT DOCUMENTS

WO       WO 02/43296 A2  *  5/2002

* cited by examiner

*Primary Examiner*—Kinfe-Michael Negash
(74) *Attorney, Agent, or Firm*—Lumen Interlectual Property Services Inc.

(57) ABSTRACT

A wavelength division multiplexing (WDM) apparatus and a WDM method are disclosed. The apparatus generally comprises an optical interleaver coupled to one or more WDM modules. Two or more interleaver modules may be cascaded together to expand the channel handling capacity. Alternatively, two or more WDM modules may be cascaded together to divide the even and odd channels into subsets. The interleaver interleaves a first signal, containing one or more odd channels and one or more even channels with a second signal, containing a portion of the odd channels and a third signal containing a portion of the even channels. A characteristic frequency spacing between adjacent even channels in the second signal and/or a characteristic spacing between adjacent odd channels in the third signal is about two or more times the value of a characteristic frequency spacing of adjacent channels in the first signal.

25 Claims, 9 Drawing Sheets

WDM WITH OPTICAL INTERLEAVING FOR INCREASED CHANNEL CAPACITY

FIELD OF THE INVENTION

This invention relates generally to optical communication systems. More particularly, this invention relates to wavelength division multiplexing (WDM) systems.

BACKGROUND ART

Optical wavelength division multiplexing (WDM) has gradually become the standard backbone network for fiber optic communication systems. WDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM technology. As the volume of traffic increases, more and more channels must be utilized. However, the bandwidth of the electromagnetic spectrum suitable for optical communication is limited. Consequently, the spacing of adjacent has channels decreased. The decrease in channel spacing has led to the development of dense wavelength division multiplexing (DWDM) technology and ultra dense WDM (UDWDM).

Optical communications systems use components referred to generically as optical interleavers to combine, split, or route optical signals of different channels. Interleavers are described, for example, in U.S. Pat. No. 5,694,233, issued to Wu et al. on Dec. 2, 1997. Interleavers typically fall into one of three categories, multiplexers, de-multiplexers and routers. A multiplexer takes optical signals of different channels from two or more different input ports and combines them so that they may be optically coupled to an output port for transmission over a single optical fiber. A de-multiplexer divides a signal containing two or more different channels according to their wavelength ranges and directs each channel to a different dedicated fiber. An optical interleaver can spatially separate dense WDM (DWDM) or ulra-dense WDM (UDWDM) signals into two complementary subsets, each having twice the original channel spacing. A router works much the same way as a de-multiplexer. However a router can selectively direct channels according to control signals to a desired coupling between an input channel and an output port.

Interleavers and routers separate or combine optical signals in two distinct wavelength ranges. These two wavelength ranges may define two or more distinct optical channels. FIG. 1 depicts a typical spectral response for an interleaver that uses birefringent waveplates. In FIG. 1 transmission 100 is plotted as a function of frequency 102. The spectral response is characterized by one or more passbands 110 separated by a well-defined channel spacing. Alternating passbands may be grouped so as to transmit one set of channels 111, e.g. odd channels, and one or more complementary sets of channels, e.g. even channels (not shown). The even channels typically have passbands that lie in between adjacent odd channels and vice versa.

In a de-multiplexing mode, an interleaver module would direct the odd channels to one I/O port and the even channels to another. Known interleaver designs are capable of separating odd channels from even channels where adjacent even/odd channel pairs are separated by less than 50 GHz. By cascading two or more interleaver modules it is possible to couple each individual channel to a particular I/O port. This works well enough if the number of channels is relatively small. However, as the number of channels increases, the number of cascaded interleaver stages also increases. The optical losses associated with each stage add up and the total loss becomes prohibitive. A large number of cascaded interleaver modules also adds complexity and cost. Furthermore, a large number of cascaded interleaver modules can make the size of the interleaver apparatus prohibitive where space is at a premium.

To overcome this WDM systems have been developed to direct each individual channel to a particular destination. Such systems typically use technologies based on thin film filters (TTF), arrayed wave guides (AWG) or fiber Bragg gratings (FBG) to separate the channels according to the carrier signal frequency. However, these methods are typically limited to channel spacings on the order of 100 GHz or greater. It is expensive to manufacture WDM modules capable of handling smaller channel spacings. Unfortunately, as the amount of communications traffic increases, more channels are required and channel spacing decreases.

There is a need, therefore, for an improved optical communications apparatus and method that overcomes the above difficulties.

OBJECTS AND ADVANTAGES

Accordingly, it is a primary object of the present invention to provide an apparatus for handling DWDM using WDM modules. It is an additional object of the invention to provide a scalable DWDM system capable of handling an arbitrarily large number of channels.

SUMMARY

These objects and advantages are attained by a wavelength division multiplexing (WDM) apparatus and a WDM method. According to a first embodiment, the apparatus comprises an optical interleaver coupled to one or more wavelength division multiplexing (WDM) modules. In a second embodiment, two or more interleaver modules may be cascaded together to expand the channel handling capacity. In a third embodiment, two or more WDM modules are cascaded together to divide the even and odd channels into subsets. According to the method, the interleaver interleaves a first signal, containing one or more odd channels and one or more even channels with a second signal, containing a portion of the odd channels and a third signal containing a portion of the even channels. A characteristic frequency spacing between adjacent even channels in the second signal and/or a characteristic spacing between adjacent odd channels in the third signal is about two or more times the value of a characteristic frequency spacing of adjacent channels in the first signal.

The interleaver may optionally comprise one or more modules of any conventional type, such as modules based on birefringent walk-off elements. The apparatus may incorporate apodizing or wavelength-slicing elements to accommodate narrow, e.g. less than 100 GHz, channel spacing.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
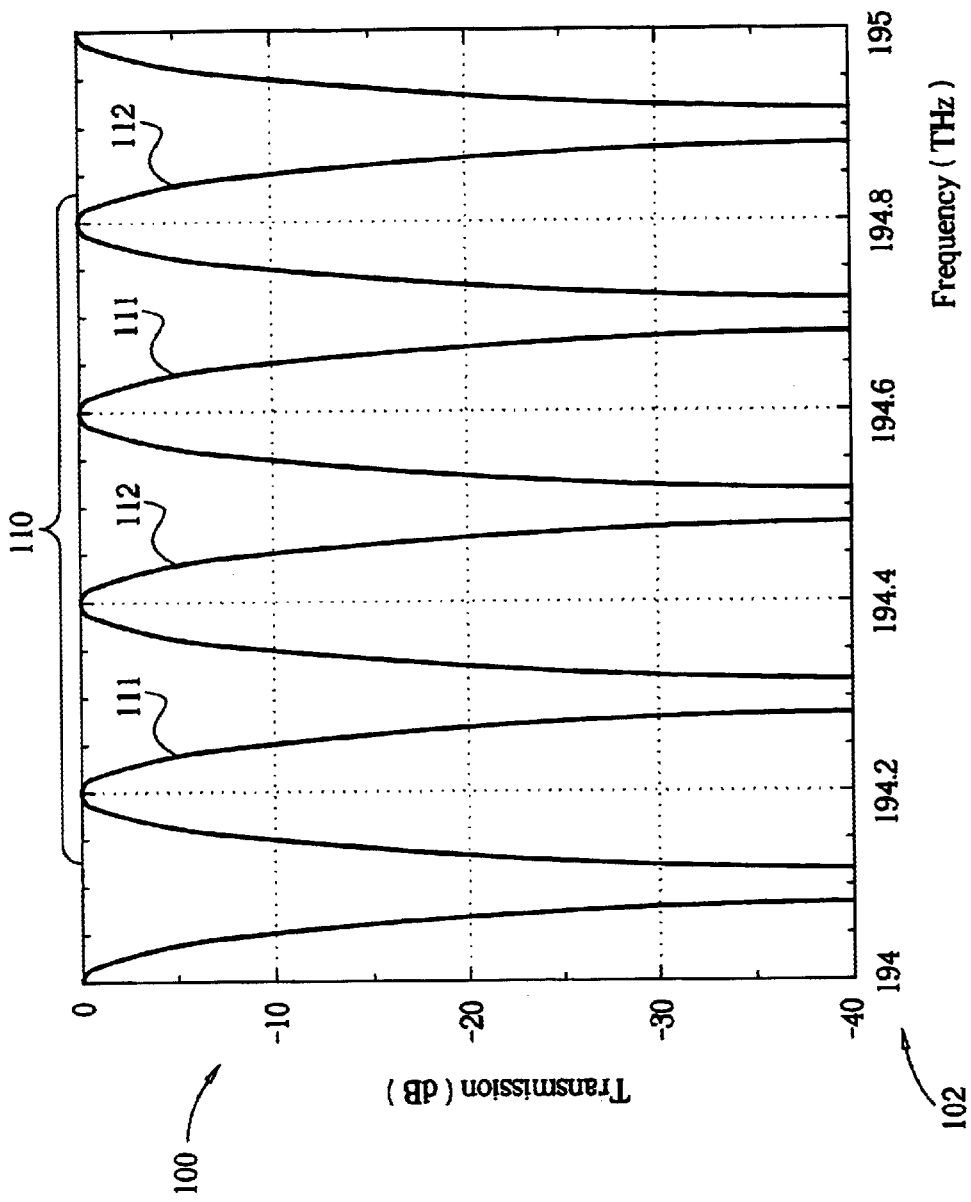
FIG. 1 depicts a typical spectral response for an interleaver that uses birefringent waveplates.
Figure 2:
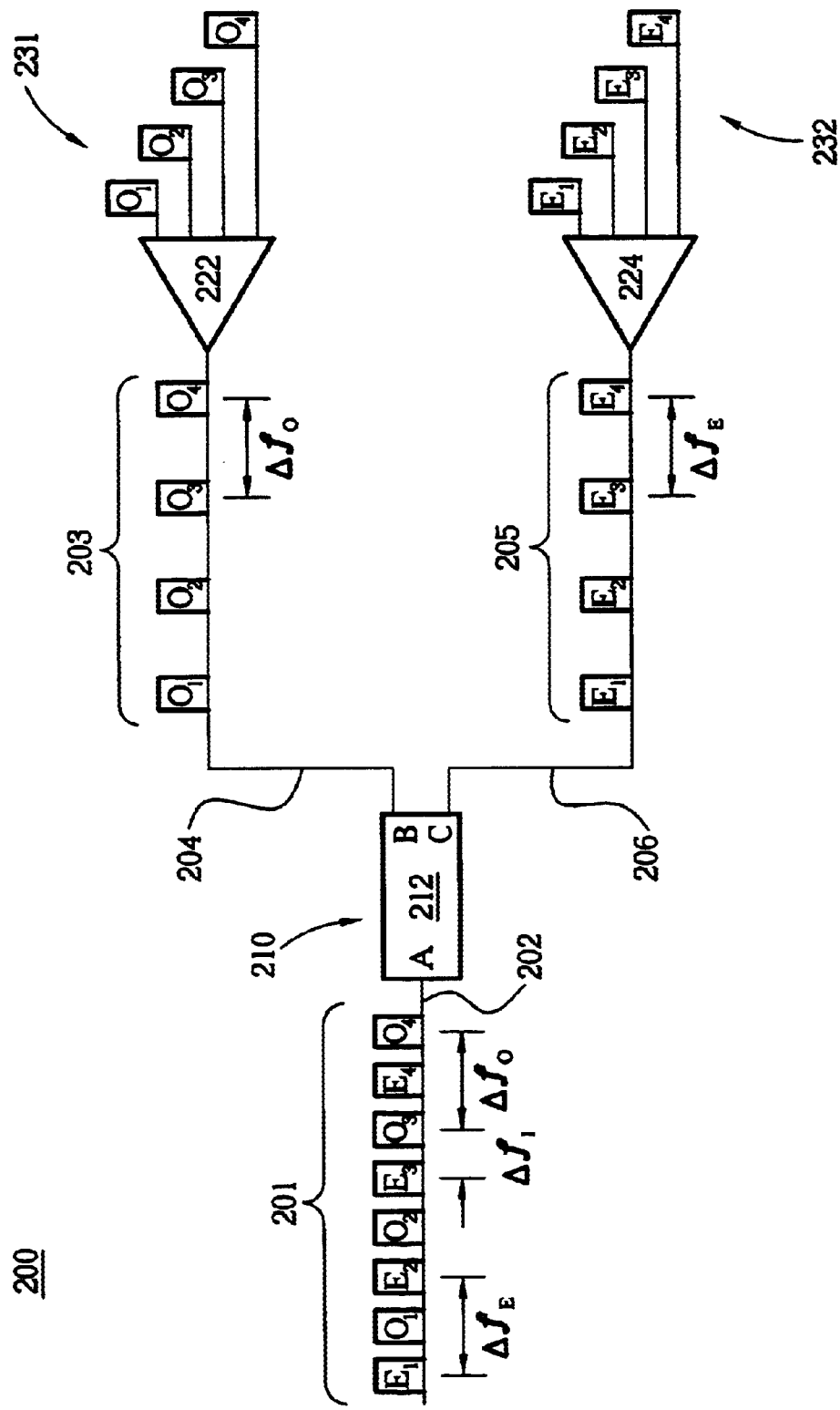
FIG. 2 depicts a simplified schematic diagram of an apparatus according to a first embodiment of the present invention.

FIG. 2 depicts an apparatus according to a first embodiment of the invention. The apparatus 200 generally comprises an optical interleaver 210 coupled to one or more WDM modules 222, 224. The interleaver 210 typically includes an interleaver module 212 and three I/O ports A, B, C. A fiber 202 is optically coupled to I/O port A and fibers 204, 206 are optically coupled to I/O ports B, C respectively. The fibers 204, 206 optically couple the interleaver 210 to WDM modules 222, 224.

Fiber 202 carries a first optical signal 201 containing odd channels $O_i$ and even channels $E_i$. The odd channels and even channels alternate in signal 201. Adjacent channels in signal 201, e.g. $O_2$ and. $E_2$ or $E_3$ and $O_3$, are spaced apart by a characteristic frequency spacing $\Delta f_1$. Even channels, are spaced apart by multiples of a characteristic spacing $\Delta f_E$ and odd channels are spaced apart by multiples of a characteristic spacing $\Delta f_O$. The characteristic frequency spacings of the even and odd channels $\Delta f_O$, $\Delta f_E$ are typically two or more times as large as the spacing of adjacent channels $\Delta f_1$ in the first signal 201.

Fiber 204 carries a second optical signal 203 that contains one or more odd channels $O_i$. The second optical signal 203 may include any portion of the odd channels $O_i$ in the first signal 201. For the purposes of this application, a portion of the channels means anywhere from one channel to all the channels. Fiber 206 carries a third optical signal 205 that contains one or more of the even channels $E_i$. The third optical signal 205 may include any portion of the even channels $E_i$ in the first signal 201. The WDM module 222 multiplexes individual odd channels 231 from separate sources to form second signal 203. Alternatively the WDM module may demultiplex second signal 203 into separate individual odd channels. In a similar fashion, the WDM module 224 may multiplex or demultiplex the between the third signal 205 and individual even channels carried by single channel fibers 232.

The WDM modules 222, 224 are typically capable of separating adjacent channels, e.g., $O_2$ and $O_3$ or $E_3$ and $E_4$, having a characteristic frequency spacing not less than $\Delta f_2$, which is greater than $\Delta f_1$. The WDM modules 222, 224 may include any suitable type of WDM devices such as thin film filter (TTF), arrayed wave guide (AWG) or fiber Bragg grating (FBG) devices. The optical interleaver 210 interleaves optical signals 201, 203 and 205. If the first optical signal is an input signal at I/O port A, the interleaver 210 separates one or more of the odd channels $O_i$ from the first signal 201 to form the second signal 203, which is coupled to I/O port B. In a similar fashion, the interleaver 210 may separate out one or more of the even channels $E_I$ from the first signal 201 to form the third signal 205, which is coupled to I/O port C. If the second signal 203 and third signal 105 are input signals at I/O ports B and C respectively, the interleaver 210 combines one or more of the odd channels $O_I$ from second signal 203 with one or more of the even channels $E_I$ from third signal 205 to form signal 201. Because $\Delta f_O$ and $\Delta f_E$ are two or more times greater than $\Delta f_1$, the spacing between adjacent channels in the second and third signals 203, 205 will be greater than $\Delta f_2$ and WDM modules 222, 224 will be able to multiplex or demultiplex signals 203, 205.

Although two WDM modules 222, 224 are depicted in FIG. 2, the apparatus 200 may be constructed with only a single module to multiplex/demultiplex either the even channels or the odd channels. Furthermore, interleaver module 212 may include a routing capability so that the interleaver 210 may route the even and odd channels between I/O ports B and C.

Figure 3:
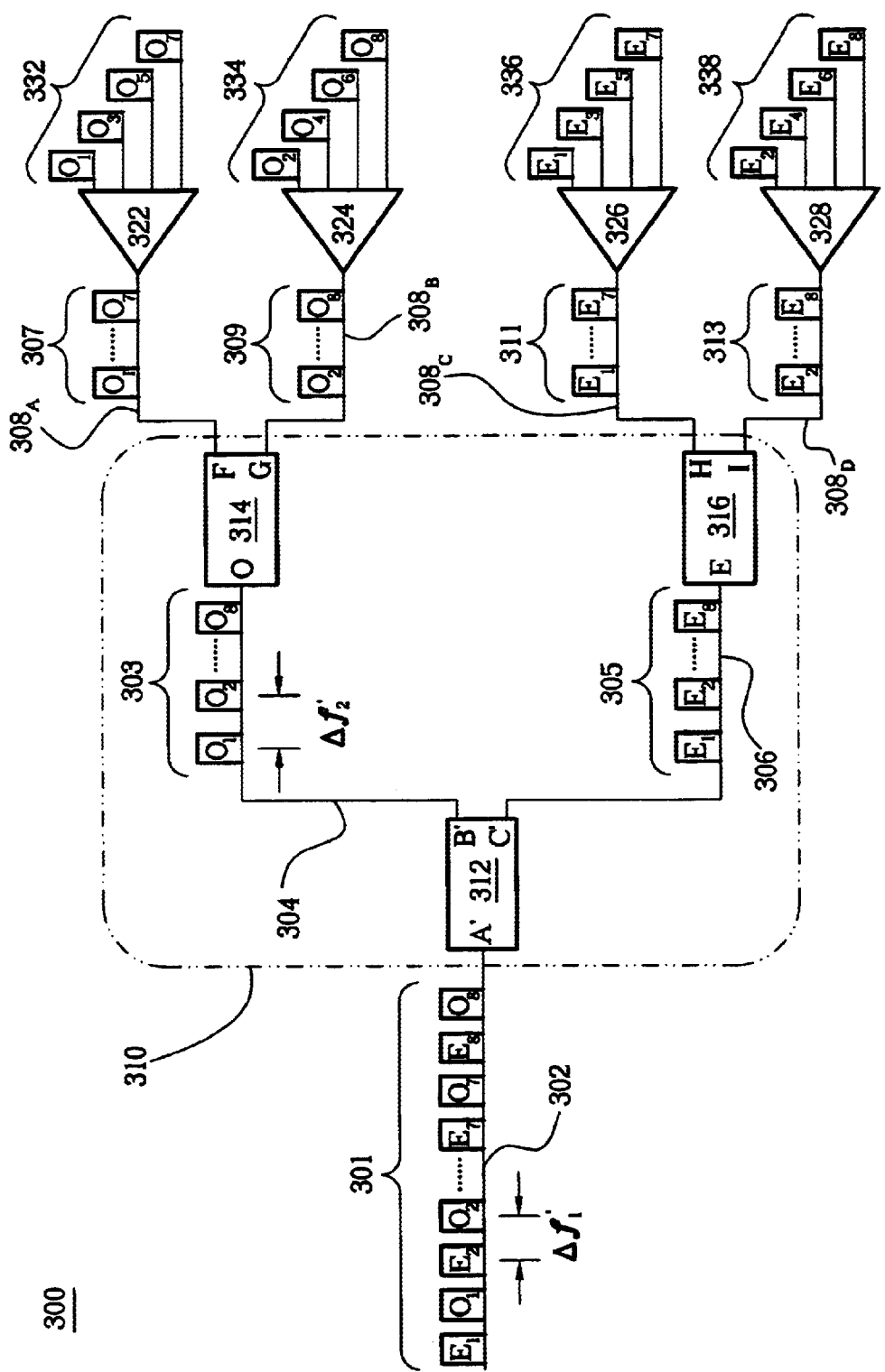
FIG. 3 depicts a simplified schematic diagram of an apparatus according to a second embodiment of the present invention.

It is possible to expand the number of channels served by the apparatus 200 by cascading two or more interleaver modules in two stages. FIG. 3 depicts an embodiment of an apparatus according to a second embodiment of the invention. The apparatus 300 generally comprises an optical interleaver 310 coupled to WDM modules 322, 324, 326, 328. The interleaver 310 typically includes a first stage comprising a first interleaver module 312 and a second stage comprising second and third interleaver modules 314, and 316 respectively. The interleaver 310 has a main I/O port A' at first interleaver module 312. A main optical fiber 302 is optically coupled to main I/O port A' and fibers 304, 306 are optically coupled to intermediate I/O ports B', C' respectively. The fibers 304, 306 optically couple the first interleaver module 312 to the second and third interleaver modules 314, 316 at intermediate I/O ports D', E' respectively. Fibers $308_A$, $308_B$, couple I/O ports F, G of the second interleaver 314 to WDM modules 322, 324 respectively. Fibers $308_A$, $308_B$, couple I/O ports H, I of the third interleaver 316 to WDM modules 326, 328 respectively. The WDM modules 322, 324, 326, 328 send and receive signals via single channel fibers 332, 334, 336, 338.

The apparatus 300 interleaves optical signals between the single channel fibers 332, 334, 336, 338 and the main fiber 302. The apparatus 300 may multiplex individual channels from fibers 332, 334, 336, 338 onto fiber 302. Alternatively, the apparatus 300 may demultiplex individual channels carried by the main fiber 302 onto the single channel fibers 332, 334, 336, 338.

The operation of the apparatus 300 in a demultiplexing mode proceeds as follows. Fiber 302 carries A WDM signal 301 containing odd channels $O_1 \ldots O_8$ and even channels $E_1 \ldots E_8$. Although eight even channels and eight odd channels are depicted and described herein, those skilled in the art will recognize that the apparatus may operate on any number of channels, even a single channel. Adjacent channels, e.g. $E_2$ and $O_2$ in WDM signal 301 are separated by a frequency spacing $\Delta f_1'$. The first interleaver module couples the odd channels $O_1 \ldots O_8$ to intermediate I/O port B' and the even channels $E_1 \ldots E_8$ to intermediate I/O port C'. Fiber 304 carries an intermediate signal 303 containing the odd channels $O_1 \ldots O_8$ to the second interleaver module 314. Fiber 306 carries an intermediate signal 305 containing the even channels $E_1 \ldots E_8$ to the third interleaver module 316. Adjacent channels in signals 303, 305 are separated by a frequency spacing $\Delta f_2'$ that is two or more times as large as the spacing $\Delta f_1'$ for adjacent channels in signal 301.

The second interleaver 314 separates the intermediate signal 303 into sub-signals 307, 309, which are coupled from I/O ports F, G to WDM modules 322, 324 via fibers $308_A$, $308_B$ respectively. Signal 307 contains a first subset of the odd channels, e.g. channels $O_1$, $O_3$, $O_5$, $O_7$, and signal 309 contains a second subset of the odd channels e.g. channels $O_2$, $O_4$, $O_6$, $O_8$. The third interleaver 316 separates the intermediate signal 305 into sub-signals 311, 313, which are coupled from I/O ports H, I to WDM modules 326, 328 via fibers $308_C$, $308_D$ respectively. Signal 309 contains a first subset of the even channels, e.g. channels $E_1$, $E_3$, $E_5$, $E_7$, and signal 309 contains a second subset of the odd channels e.g. channels $E_2$, $E_4$, $E_6$, $E_8$. Adjacent channels in subsignals 307, 309, 311, 313, e.g. channels $O_2$ and $O_4$ in sub-signal 309 are separated by frequency spacing $\Delta f_3'$, which is two or more times as great as the frequency spacing $\Delta f_2'$, for adjacent channels in signals 303, 305. The WDM modules 322, 324, 326, 328 separate the individual channels from the sub-signals 307, 309, 311, 313 and direct then onto the single channel fibers 322, 324, 326, 328. The WDM modules 322, 324, 326, 328 may include any suitable type of WDM devices such as thin film filter (TTF), arrayed wave guide (AWG) or fiber Bragg grating (FBG) devices.

Although four WDM modules 322, 324, 326, 328 are depicted in FIG. 3, the apparatus 300 may be constructed with only a single module to multiplex/demultiplex either the even channels or the odd channels. Furthermore, any or all of the interleaver modules 312, 314, 316 may include a routing capability so that the interleaver 310 may route the even and odd channels between I/O ports F, G, H and I.

An apparatus having a cascaded design such as that depicted in FIG. 3 can handle a channel spacing that is half of the channel spacing that can be handled by a single stage design. Each interleaver stage effectively allows for a doubling of the channel capacity. For example, if the WDM modules, 322, 324, 326, and 328 can handle a channel spacing of 200 GHz, the apparatus 300 can accommodate a channel spacing of 50 GHz in the first optical signal 301.

Figure 4:
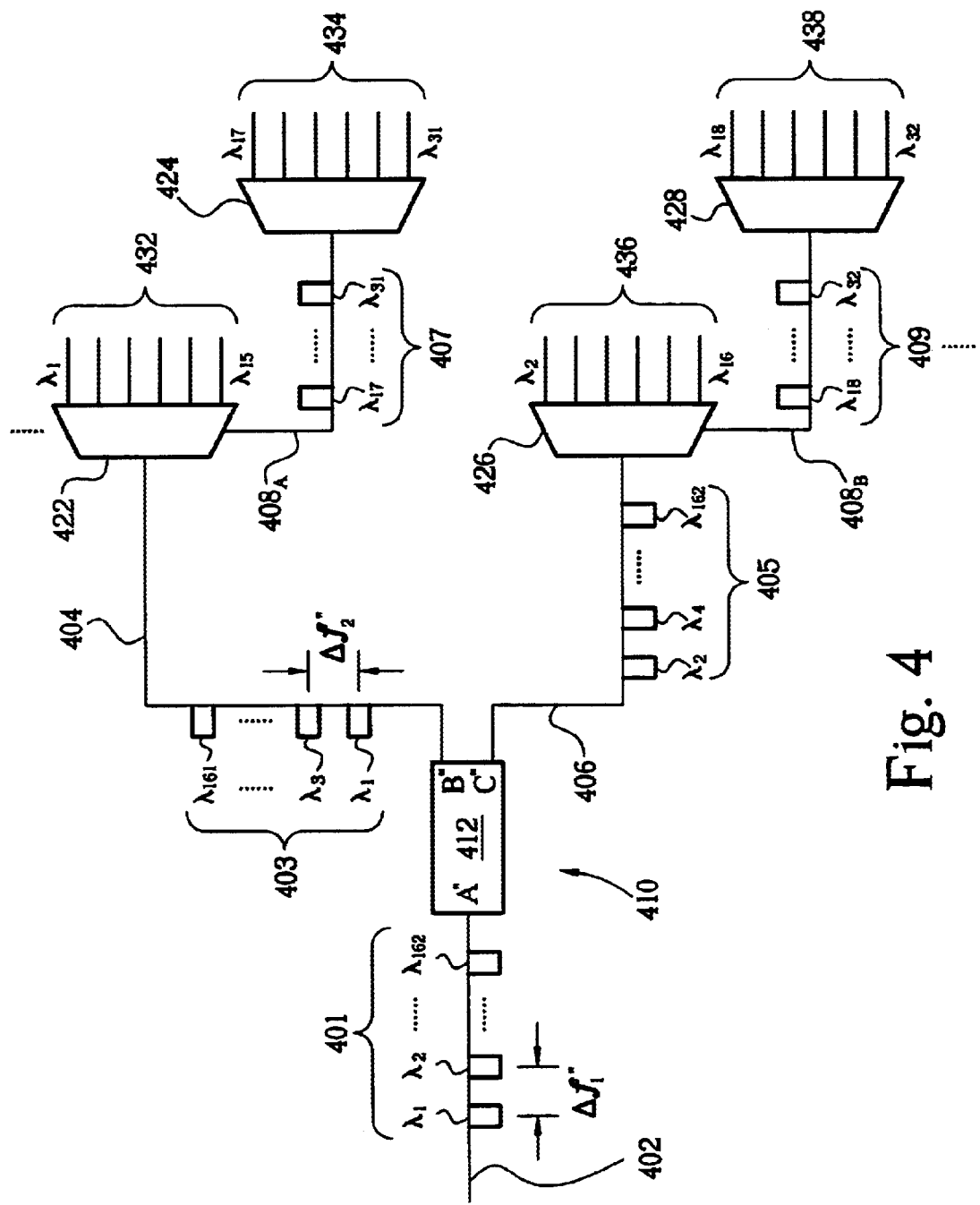
FIG. 4 depicts a simplified schematic diagram of an apparatus according to a third embodiment of the present invention.

There are other ways of extending the channel capability using only a single stage interleaver. FIG. 4 depicts a simplified schematic diagram of an apparatus according to a third embodiment of the present invention. The apparatus 400 generally comprises an interleaver 410 optically coupled to thin film filter (TTF) based DWDM modules 422, 424, 426, 428 to achieve ultra-dense channel spacing in optical transmission. DWDM apparatus based on AWG, FBG and other technologies can be constructed similarly. The interleaver 410 typically includes an interleaver module 412 having I/O ports A", B", C". A fiber 402 is optically coupled to I/O port A" and fibers 404, 406 are optically coupled to I/O ports B", C" respectively. The fibers 404, 406 optically couple the interleaver 410 to WDM modules 422, 426. Fibers $408_A$ optically couples WDM module 422 to WDM module 424. Fiber $408_B$ optically couples WDM module 426 to WDM module 428.

Fiber 402 carries a first optical signal 401 containing odd channels $\lambda_1, \lambda_3, \lambda_5, \ldots \lambda_{161}$, and even channels $\lambda_2, \lambda_4, \lambda_6, \ldots \lambda_{162}$. The odd channels and even channels alternate in signal 401. Adjacent channels in signal 401, e.g. $\lambda_2$ and $\lambda_3$, are spaced apart by a characteristic frequency spacing $\Delta f_1''$. Even channels, are spaced apart by multiples of a characteristic spacing $\Delta f_E''$ and odd channels are spaced apart by multiples of a characteristic spacing $\Delta f_O''$. The characteristic frequency spacings of the even and odd channels $\Delta f_O''$, $\Delta f_E''$ are typically two or more times as large as the spacing of adjacent channels $\Delta f_1''$ in the first signal 401. The value of $\Delta f_1''$ is related to the channel spacing capacity of the WDM modules 422, 424, 426, 428. For example if the WDM modules are capable of handling 200 GHz channel spacing and the interleaver module 412 can handle a channel spacing of 100 GHz, $\Delta f_1''$ is 100 GHz. [Inventor: Is this right?]

Fiber 404 carries a second optical signal 403 that contains one or more odd channels, e.g., channels $\lambda_1, \lambda_3, \lambda_5, \ldots \lambda_{161}$. The second optical signal 403 may include any portion of the odd channels in the first signal 401. Fiber 406 carries a third optical signal 405 that contains one or more of the even channels $\lambda_2, \lambda_4, \lambda_6, \ldots \lambda_{162}$. The third optical signal 405 may include any portion of the even channels in the first signal 401. The WDM module 422 multiplexes a first subset of the odd channels from separate single channel fibers 432 to form second signal 403. Alternatively the WDM module may demultiplex second signal 403 onto separate individual fibers 432. WDM module 422 multiplexes or demultiplexes a second set of odd channels between fiber 404 and individual fibers 434. For example, in a multiplexing mode, WDM 424 module may multiplex individual odd channels $\lambda_{17}, \lambda_{19}, \ldots \lambda_{31}$ into a signal 407 carried by fiber $408_A$. WDM module 422 then multiplexes the odd channels $\lambda_{17}, \lambda_{19}, \ldots \lambda_{31}$ into the second optical signal 403. Alternatively, WDM module 422, can demultiplex signal 407 from signal 403 and WDM module 424 can demultiplex the individual odd channels in the second subset onto the single channel fibers 434. In a similar fashion, the WDM module 424 may multiplex or demultiplex the between the third signal 405 and individual even channels carried by single channel fibers 436 and/or single channel fibers 438.

Those skilled in the art will recognize that the above apparatus may be readily scaled up by adding on additional WDM modules or interleaver modules. Thus the apparatus may expand as channel demand increases.

Figure 5:
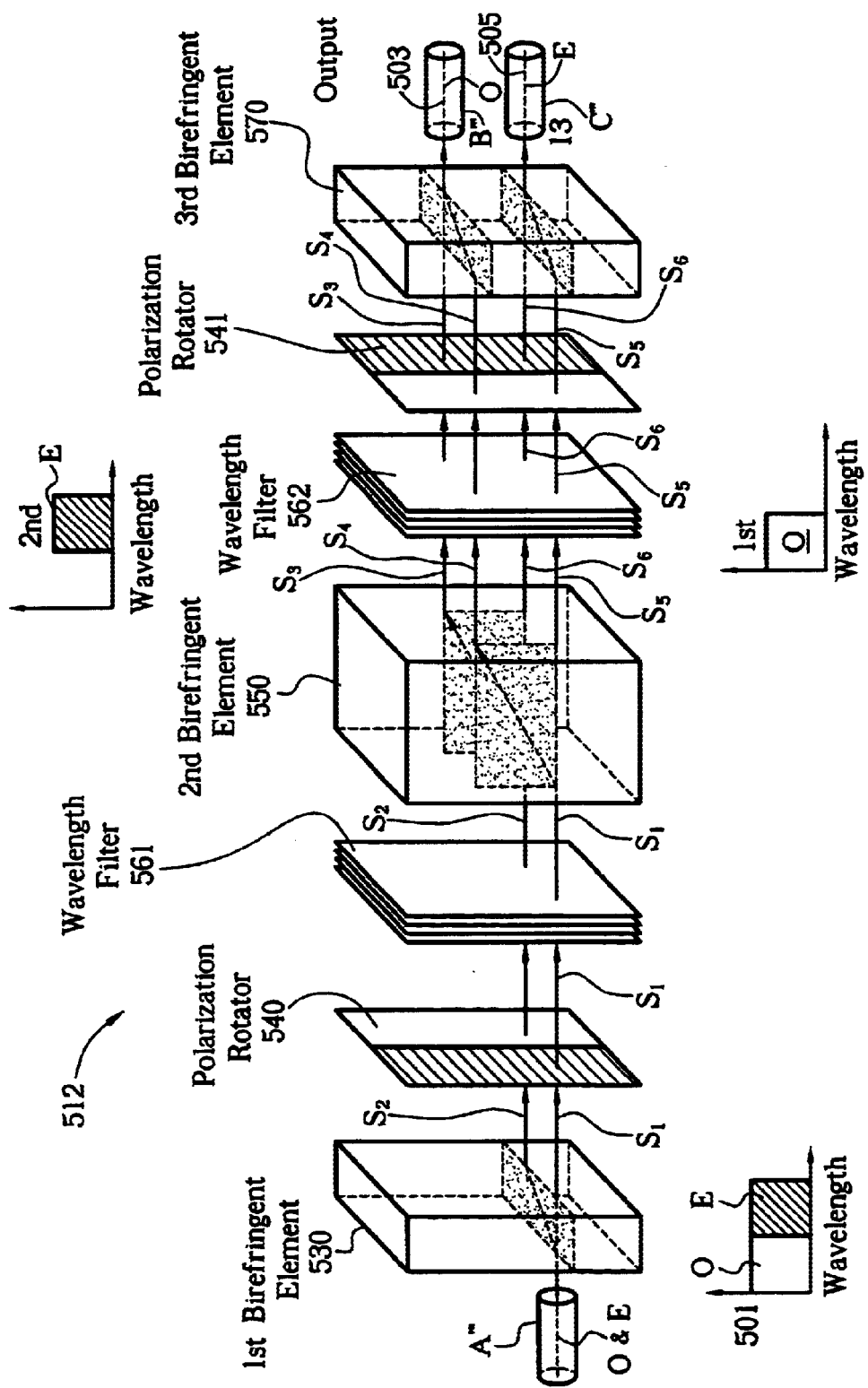
FIG. 5 depicts a simplified schematic diagram of an embodiment of an interleaver module for use with embodiments of the apparatus of the present invention.

Any type of interleaver module may be used in interleavers 210, 310 and 410 depicted above. FIG. 5 depicts a typical optical interleaver module 512 may be used as the embodiments described and depicted above. Such a module is described in U.S. Pat. No. 5,694,233, issued to Wu et al. on Dec. 2, 1997, which is incorporated herein by reference for all purposes. The module 512 generally comprises first, second and third birefringent elements 530, 550, and 570, first and second polarization rotators 540, 541 and first and second wavelength filters 561, 571. The module 512 may combine, separate, or route WDM signals. For example, a first signal 501 containing first and second channels O, E enters interleaver module 512 at an I/O port A'". The first birefringent element 530 spatially separates WDM signal S into horizontal and vertically polarized beams $S_1$ and $S_2$ by a horizontal walk-off. Component beams $S_1$ and $S_2$ both carry the full frequency spectrum of the first signal S.

The first birefringent element 530 is optically coupled to a polarization rotator 540. The rotator 540 selectively rotates the polarization state of either beam $S_1$ or $S_2$ by a predefined amount. By way of example, in FIG. 5 the polarization of beam $S_2$ is rotated by 90° so that beams $S_1$, $S_2$ are both horizontally polarized when they enter a wavelength filter 561.

Wavelength filter 561 selectively rotates the polarization of wavelengths in either the first channel O or second channel E. For example wavelength filter 561 rotates wavelengths in the first channel O by 90° but does not rotate wavelengths in the second channel E at all. Thus, in the filtered beams $S_1$, $S_2$, the first channel O is vertically polarized and the second channel E is horizontally polarized. The filtered beams $S_1$ and $S_2$ enter the second birefringent element 550 that walks off the vertically polarized first channel O from the horizontally polarized second channel E to form beams $S_3$, $S_4$, and $S_5$, $S_6$ respectively. Beams $S_3$, $S_4$, $S_4$, and $S_6$ are then optically coupled to the second wavelength filter 562. The second wavelength filter 562 selectively rotates the polarizations of beams $S_3$, $S_4$ but not beams $S_5$, $S_6$ so that the polarizations of all four beams are parallel each other. The second polarization rotator 541 then rotates the polarizations of beams $S_3$, $S_5$, but not $S_4$, $S_6$. All four signals then enter a third birefringent element 570.

The third birefringent element 570 combines beams $S_3$ and $S_4$, to form a second signal 503, which is coupled I/O port B'. Birefringent element 570 also combines beams $S_5$ and $S_6$ to form a third signal 505, which is coupled into output port C'''.

As described above, interleaver 512 operates as a demultiplexer. By operating interleaver 512 in reverse, i.e., starting with channels O, E at ports B''' and C''' respectively, interleaver operates as a multiplexer. Furthermore, by suitably controlling the polarization rotation induced by rotators 540 and 541, interleaver 512 may be configured to operate as a router.

Figure 6A:
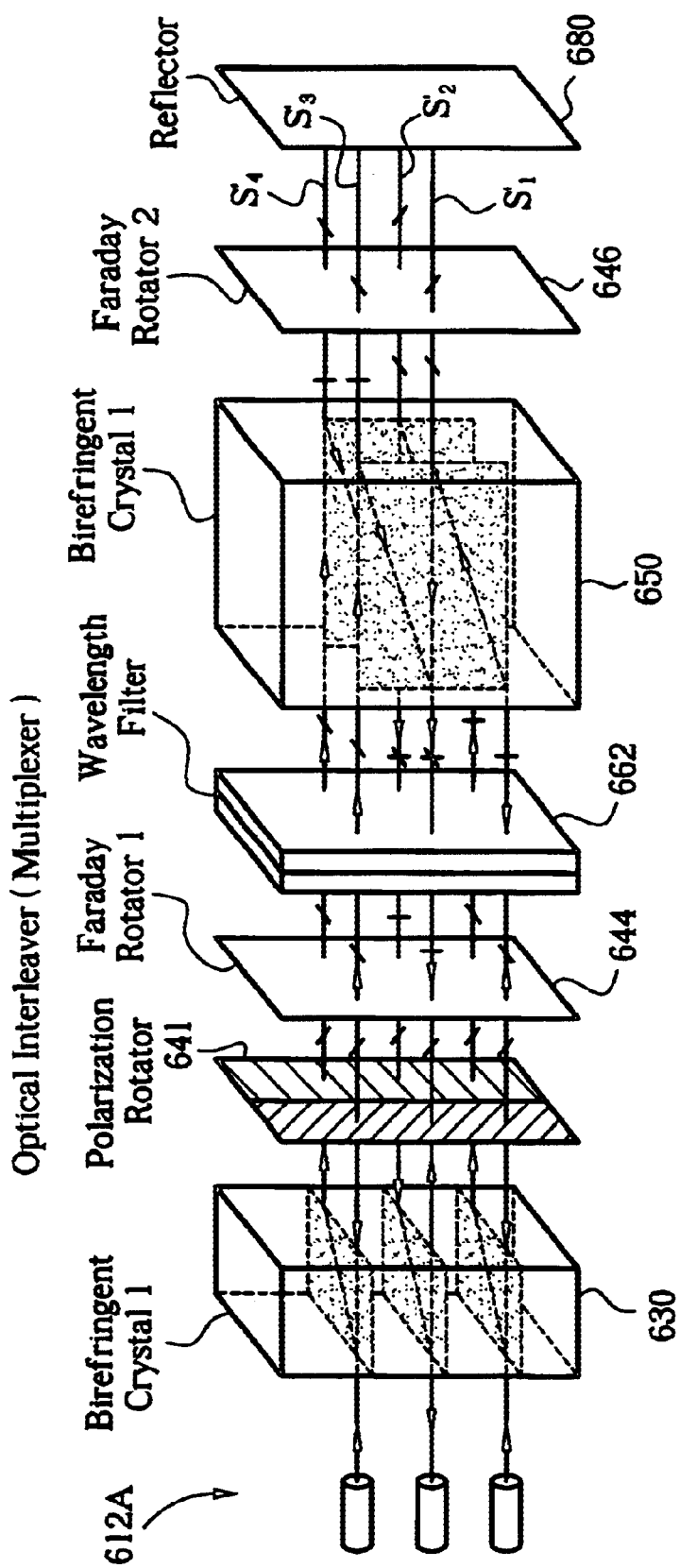
FIGS. 6A–6B depict simplified schematic diagrams of a first and second alternative embodiments of interleaver modules for use with the apparatus of the present invention.

FIG. 6A depicts a first alternative embodiment of an optical interleaver module 612A that uses fewer components than interleaver 512 does. Interleaver 612A generally comprises, first and second birefringent elements 630, 650, a wavelength filter 662, polarization rotators 640, 644, 646 and a retro-reflector 680. The operation of the interleaver 600 is similar to that described above with respect to the interleaver module 512 of FIG. 5. The retro-reflector 680 reflects beams $S_3'$, $S_4'$, $S_5'$, and $S_6'$ back through the optical elements of interleaver module 612A in reverse order to multiplex or demultiplex optical signals. Interleaver modules of the type depicted in FIG. 6A are described in detail in commonly assigned U.S. patent application Ser. No. 09/495,020 to Wei-Zhong Li, entitled "Optical Interleaver", which is incorporated herein by reference.

Figure 6B:
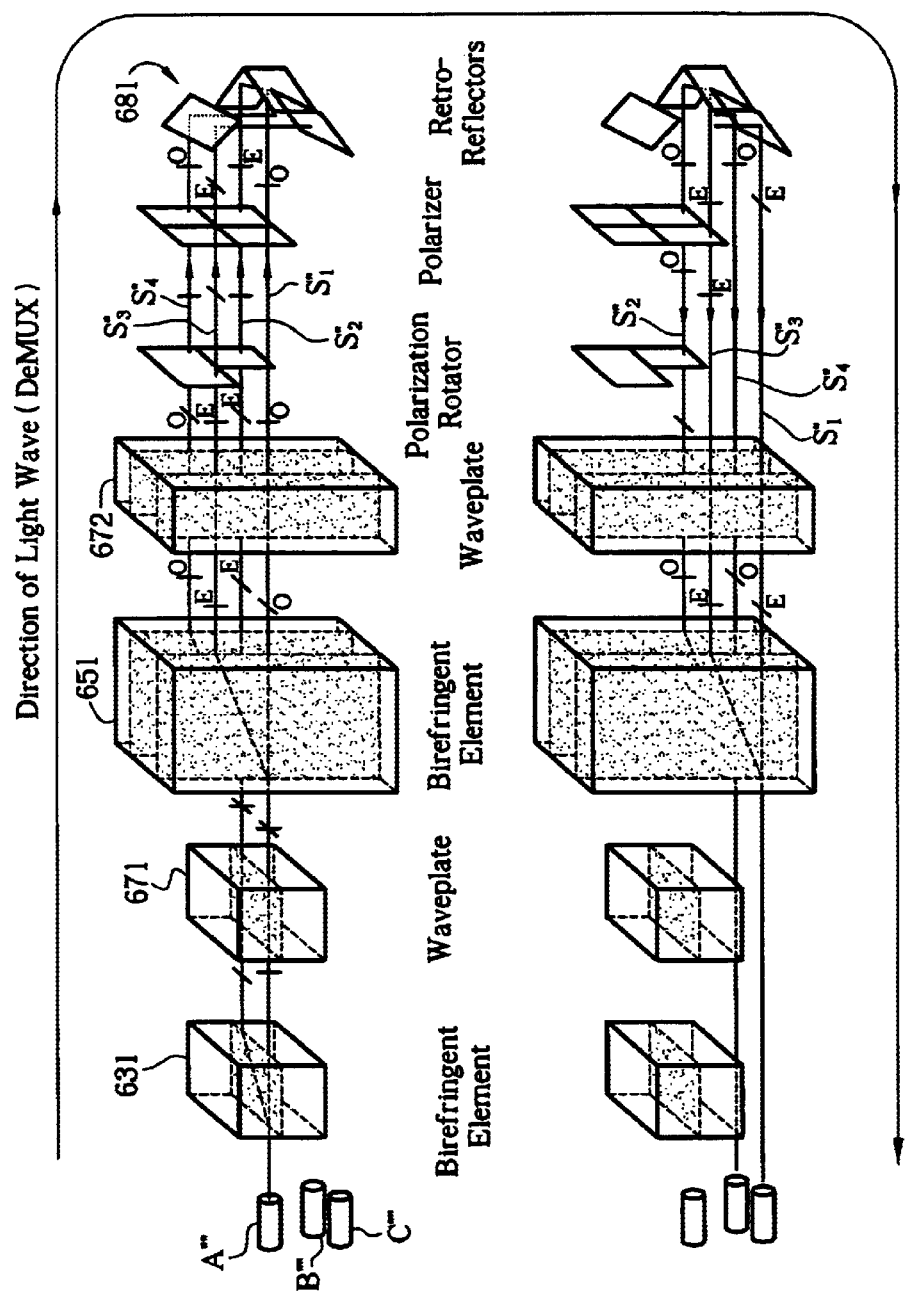

FIG. 6B depicts a schematic diagram of a second alternative embodiment of a folded interleaver module. The interleaver module 612B generally comprises a first birefringent element 631, a first waveplate 671, a second birefringent element 651 a second waveplate 672, a polarization rotator 643, an optional polarizer 645 and a retro reflector 681. The first birefringent element 631 is optically coupled to a first optical input/output (I/O) port A"" and the first waveplate 671. The first waveplate 671 is optically coupled to the second birefringent element 651. The second birefringent element 206 is optically coupled to the second waveplate 672. The second waveplate 672 is optically coupled to the polarization rotator 643. The polarization rotator 643 is optically coupled to the polarizer 645. The polarizer 645 is optically coupled to the retro-reflector 681. Second and third I/O ports B"" and C"" are optically coupled to the second birefringent element 651. Although the elements of the interleaver 612B are depicted as being arranged linearly, those skilled in the art will be to devise other arrangements without deviating from the scope of these teachings.

Waveplates 671, 672 rotate the odd channels but not the even channels. The elements of split an input optical signal into four beams $S_1''$, $S_2''$, $S_3''$, $S_4''$ in a manner having features in common with that described with respect to interleaver module 512 above. However on a forward path, beams $S_1$ and $S_4$, which contain odd channels O, end up diagonally opposed between the second birefringent element 651 and the second waveplate 672. A similar thing happens to beams $S_1''$ and $S_4''$, which contain even channels E. The retro-reflector 681 reflects the four beams $S_1''$, $S_2''$, $S_3''$, $S_4''$ back through the second waveplate 672 and the second birefringent element 651 on the return path shown in the lower part of FIG. 6B. The retro-reflector 681 also spatially displaces beams $S_3''$ and $S_4''$ so that they bypass the polarizer 645 and the polarization rotator 642 on the return path. In addition, the retro-reflector 681 crosses over beams $S_1''$ and $S_2''$ so that beam $S_2''$ follows a reverse path that is substantially co-linear with the forward path for beam $S_1''$ and beam $S_1''$ follows a reverse path that is substantially co-linear with the forward path for beam $S_2''$. This ensures that the second birefringent element 651 properly recombines the beam $S_1''$ with $S_4''$ and beam $S_2''$ with beam $S_3''$.

Interleaver modules of the second alternative embodiment are described in detail in commonly assigned U.S. patent application Ser. No. 09/702,962 (Agents Docket No. OPL-112) to Hongtoa Hou et al. entitled "Folded Optical Interleaver with Optional Routing Capability," which is incorporated herein by reference.

The spacing of adjacent channels that can be separated or combined by an interleaver module depends on the shape of the spectra corresponding to the individual channels. It may be desirable to narrow the passbands of the spectral response. For this purpose an apodizing or wavelength-slicer filter may be included in the interleaver. A wavelength-slicing filter cuts off portions of the spectra to produce spectra having steeper slopes at their edges. Alternatively, wavelength slicing can be used to flatten the top of a transmitted spectrum. The wavelength trimmer generally comprises two filters having passbands centered on frequencies that are offset from each other and offset with respect to the corresponding channel frequency. Exemplary wavelength-slicing and flatting filters are described in detail in commonly assigned U.S. patent application Ser. No. 09/534,755 entitled "Wavelength Slicer for Optical Signal Switching" to Hongtao Hou and Qin Zhong, which is incorporated herein by reference. Such a wavelength slicer can be incorporated into an interleaver module such as those depicted in FIG. 5 or FIG. 6 anywhere along the path of the various beams after the first walk-off and before the final recombination.

Figure 7A:
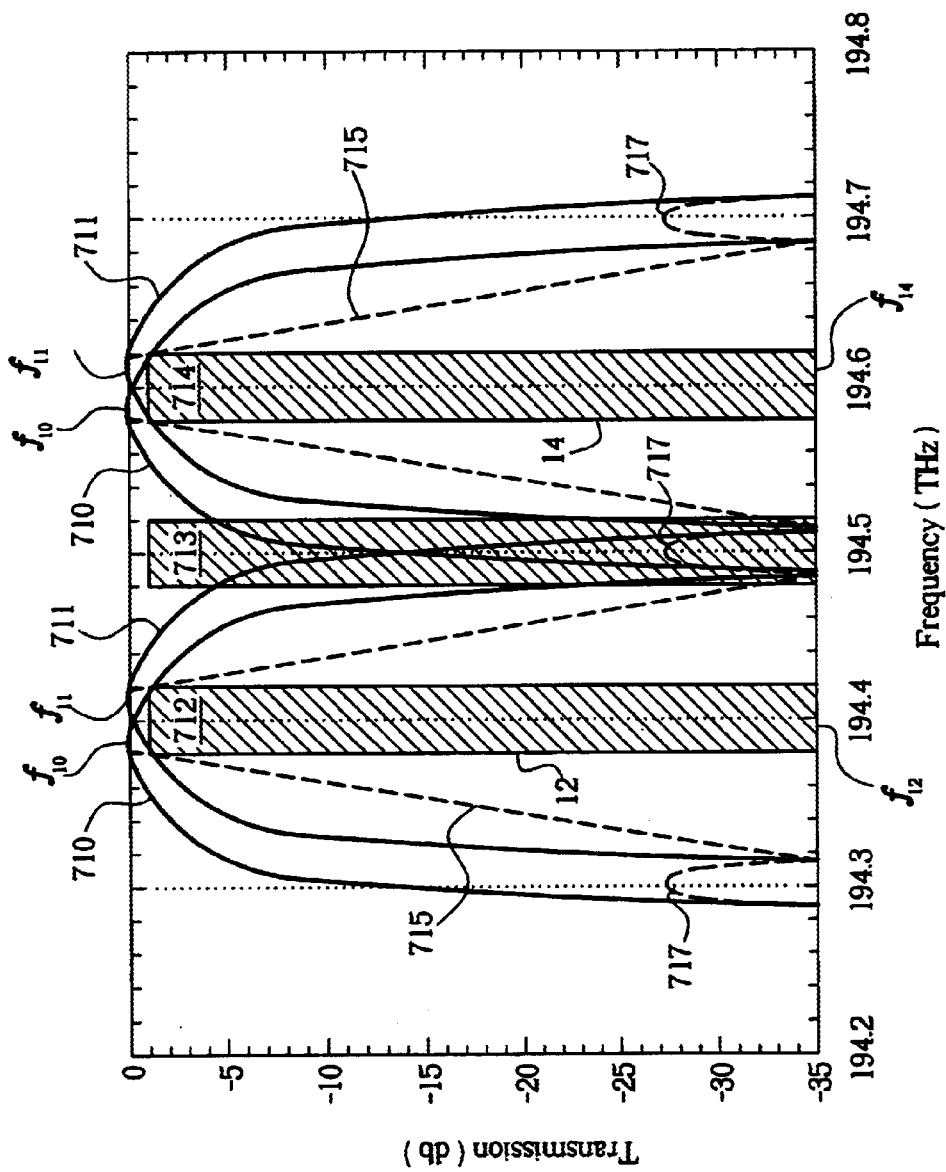
FIGS. 7A–7B depict the operation of a wavelength trimmer for use with the embodiments of the apparatus of the present invention.
Figure 7B:
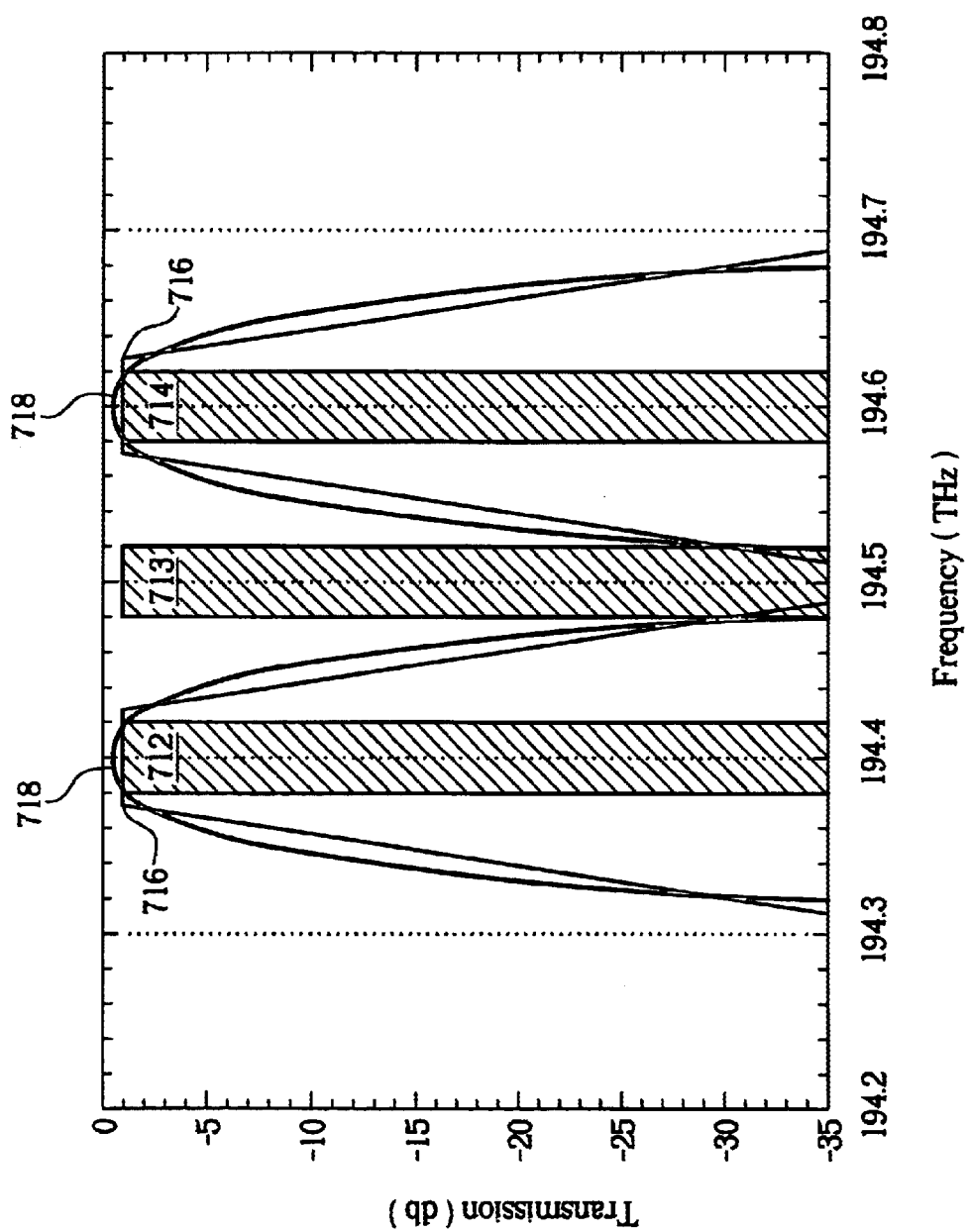

An example of wavelength slicing to increase optical isolation is depicted in FIGS. 7A–7B. FIG. 7A depicts a periodic spectrum of an optical signal. The signal depicted contains, for example, even channels 712 and 714 and odd channel 713. Channels 712, 713 and 714 pass through wavelength-slicer filters represented by passbands 710 and 711. Note that the center frequencies $f_{10}$ of passband 710 are slightly offset from the center frequencies $f_{11}$, of passband 711. Both passbands 710 and 711 have center frequencies offset from center frequencies $f_{12}$, $f_{14}$ of even channels 712 and 714.

The combination of periodic passbands 710 and 711 produces periodic passband 715. Where passband 710 overlaps with passband 711 or vice versa, the signal transmission passband 715 is greatest. Where passbands 710 and 711 do not overlap the transmission of passband 715 is least. An ideal trapezoidal passband 716 is shown in FIG. 7A for comparison. If passbands 710 and 711 are sufficiently separated, they may overlap in odd channel 713 producing a slight bulge 717 in transmission. Even with bulge 717 the transmission within the odd channel is attenuated by about 25 dB or more.

To further improve signal isolation, a third filter, having a passband centered on the center frequencies of even channels 712 and 714 may be added to the wavelength trimmer. FIG. 7B depicts the overall effect of a trimmer having filters characterized by passbands 710 and 711 and a third filter characterized by a passband of similar shape centered on the even channels 712 and 714. The third filter increases the attenuation within odd channel 713. The combined passband 718 exhibits attenuation of about 35 dB where it crosses odd channel 713. This provides even better isolation than the "ideal" trapezoidal passband 716.

Wavelength slicing typically involves the use of filters that rotate a polarization of a portion of the spectrum of an optical signal before transmitting the signal through an appropriately oriented polarizer. The attenuation of the optical signal at a certain frequency is determined by the combination of the orientation of the polarizer and the polarization of the optical signal at that frequency. A typical trimmer filter for a wavelength slicer comprises a wavelength-selective polarization rotation device, such as a waveplate, and a polarizer.

For example, the wavelength-selective polarization rotation device selectively rotates the polarization of portions of signals having frequencies near the centers of bands 710 or 711 more than other portions. When the signals pass through a polarizer, the non-rotated portions are attenuated while the rotated portions pass through the polarizer without attenuation. Simulations of this type of wavelength-slicer configuration indicate that 50 GHz isolate in a wavelength range of about 1520 to 1600 nm (corresponding to a frequency range of about $1.875 \times 10^{14}$ to $1.973 \times 10^{14}$ Hz) is readily achievable.

It will be clear to one skilled in the art that the above embodiment may be altered in many ways without departing from the scope of the invention. For example, . . . . Accordingly, the scope of the invention should be determined by the following claims and their legal equivalents.

What is claimed is:

1. A wavelength division multiplexing apparatus comprising:
   a) an optical interleaver having first, second and third I/O ports, for interleaving a first signal, containing a one or more odd channels and one or more even channels, a second signal, containing a portion of the odd channels and a third signal containing a portion of the even channels; and
   b) a first wavelength division multiplexing (WDM) module optically coupled to one of the first, second and third I/O ports.

2. The apparatus of claim 1, wherein the interleaver optically couples the portion of the odd channels between the first I/O port and the second I/O port, wherein the interleaver optically couples the portion of odd channels between the first I/O port and the third I/O port.

3. The apparatus of claim 1 wherein a characteristic frequency spacing between adjacent even channels in the second signal and/or a characteristic spacing between adjacent odd channels in the third signal is about two or more times the value of a characteristic frequency spacing of adjacent channels in the first signal.

4. The apparatus of claim 1 wherein the wavelength division multiplexing device is a device chosen from the group consisting of thin film filter (TTF), arrayed wave guide (AWG) or fiber Bragg grating (FBG) devices.

5. The apparatus of claim 1, further comprising:
   c) a second WDM module optically coupled a different one of the first second and third I/O ports.

6. The apparatus of claim 5, further comprising:
   d) a third WDM module optically coupled to the first WDM module.

7. The apparatus of claim 6, wherein one or more of the first and second WDM modules is a thin-film-filter-based DWDM module.

8. The apparatus of claim 6, further comprising:
   e) a fourth WDM module optically coupled to the second WDM module.

9. The device of claim 1 wherein the optical interleaver includes an optical interleaver module having:
   i) a first birefringent walk-off device optically coupled to the input;
   ii) a wavelength selective polarization rotation device optically coupled to the first birefringent walk-off device; and
   iii) a second birefringent walk-off device optically coupled to the wavelength selective polarization rotation device.

10. The device of claim 9, further comprising a retro-reflector optically coupled to the second birefringent walk-off device.

11. The device of claim 1 wherein the optical interleaver includes one or more wavelength slicer modules.

12. The device of claim 11 wherein the wavelength slicer module includes:
   i) a first filter having a first passband characterized by one or more first peaks located at one or more first frequencies that are different from one or more channel frequencies of the first optical signal; and
   ii) a second filter optically coupled to the first filter having a second passband characterized by one or more second peaks located at one or more second frequencies that are different from the one or more first frequencies and the one or more channel frequencies.

13. The device of claim 1, wherein a spacing between adjacent channels in the first signal is less than 100 Gigahertz.

14. The device of claim 1, wherein the optical interleaver includes
   i) a first interleaver module optically coupled to first I/O port;
   ii) a second interleaver module, optically coupled to the first interleaver module; and
   iii) a third interleaver module optically coupled to the first interleaver module;
wherein first interleaver module optically couples the odd channels between the first I/O port and the second interleaver module, wherein the first interleaver module optically couples the odd channels between the first I/O port and the third interleaver module.

15. The apparatus of claim 14 wherein the second interleaver module is optically coupled to the second I/O port and the third interleaver module is optically coupled to the third I/O port.

16. The apparatus of claim 15 wherein the first WDM module is optically coupled to the second I/O port, the apparatus further comprising:
   (a) a second WDM module optically coupled to the third I/O port;
   (b) a fourth I/O port optically coupled to the second interleaver module;
   (c) a third WDM module optically coupled to the fourth I/O port;
   (d) a fifth I/O port optically coupled to the third interleaver module; and
   (e) a fourth WDM module optically coupled to the fifth I/O port.

17. A wavelength division multiplexing method comprising:
- a) separating an input optical signal, containing two or more channels, into a first output optical signal, containing one or more odd channels and a second output optical signal containing one or more even channels; and
- b) demultiplexing the first or second output optical signal using a wavelength division multiplexing (WDM) technique;

wherein a characteristic frequency spacing between adjacent odd channels in the first output optical signal and/or a characteristic spacing of the even channels in the second output optical signal is about two or more times the value of a characteristic frequency spacing between adjacent channels in the input optical signal.

18. The method of claim 17 wherein the WDM technique includes the use a device chosen from the group consisting of thin film filter (TTF), arrayed wave guide (AWG) or fiber Bragg grating (FBG) devices.

19. The method of claim 17, wherein a spacing between adjacent channels in the input optical signal is less than 100 Gigahertz.

20. The method of claim 17 wherein a) includes:
- i) walking-off the input signal into a first beam having a first polarization and a second beam having a second polarization, wherein the first and second beams each contain both odd and even channels;
- ii) selectively rotating a polarization of the odd channels or a polarization or the even channels;
- iii) walking-off the first beam into a third beam containing odd channels and a fourth beam containing even channels and walking off the second beam into a fifth beam a containing odd channels and a sixth beam containing even channels; and
- iv) combining the third beam with the fifth beam to form the first output optical signal; and
- v) combining the fourth beam with the sixth beam to form the second output optical signal.

21. The method of claim 17, further comprising:
- c) separating one or more of the odd channels and the even channels into two or more subsets of channels; and
- d) demultiplexing one or more of the subsets.

22. A wavelength division multiplexing method comprising:
- a) combining two or more optical signals, each containing one or more channels, using a wavelength division multiplexing (WDM) technique to form a first input optical signal; and
- b) combining the first input signal with a second input signal containing one or more channels to form an output optical signal containing one or more odd channels that alternate with one or more even channels;

wherein a characteristic frequency spacing between one or more pairs of adjacent channels in the output signal is less than or equal to half the value of a characteristic frequency spacing between adjacent channels in the first or second input optical signals.

23. The method of claim 22 wherein the WDM technique includes the use a device chosen from the group consisting of thin film filter (TTF), arrayed wave guide (AWG) or fiber Bragg grating (FBG) devices.

24. The method of claim 22, wherein a spacing between adjacent channels in the output optical signal is less than 100 Gigahertz.

25. The method of claim 22 wherein b) includes:
- i) walking-off the first input optical signal into a first beam having a first polarization and a second beam having a second polarization, wherein the first beam contains one or more odd channels;
- ii) walking-off the second input signal into a third beam having the first polarization and a fourth beam having the second polarization, wherein the second beam contains one or more even channels;
- iii) selectively rotating a polarization of the odd channels or a polarization or the even channels;
- iv) combining the first beam with the third beam to form a fifth beam;
- v) combining the second beam with the fourth beam to form a sixth beam; and
- vi) combining the fifth beam and the sixth beam to form the output optical signal.

* * * * *

UNITED STATES PATENT AND TRADEMARK OFFICE
CERTIFICATE OF CORRECTION

PATENT NO.    : 6,678,476 B1                                        Page 1 of 1
DATED         : January 13, 2004
INVENTOR(S)   : Hongtao Hou It is certified that error appears in the above-identified patent and that said Letters Patent is hereby corrected as shown below:

Column 1,
Line 24, "has channels" should read -- channels has --.
Line 42, "ulra-dense" should read -- ultra-dense --.

Column 3,
Line 37, "O2 and. E2" should read -- O2 and E2 --.

Column 6,
Lines 9 and 10, "[Inventor: Is this right?]" should be deleted.

Column 9,
Line 35, "For example, ..." should be deleted.

Signed and Sealed this

Twenty-third Day of March, 2004

JON W. DUDAS
*Acting Director of the United States Patent and Trademark Office*